US008825384B2

(12) United States Patent
Spindler et al.

(10) Patent No.: US 8,825,384 B2
(45) Date of Patent: Sep. 2, 2014

(54) DIGITAL MAP LABELING SYSTEM

(75) Inventors: Carsten-Christian Spindler, Karlsruhe (DE); Martin Fischer, München (DE); Alexey Pryakhin, München (DE); Vladimir Ivanov, München (DE); Simon Schütz, Stuttgart (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 0 days.

(21) Appl. No.: 13/426,304

(22) Filed: Mar. 21, 2012

(65) Prior Publication Data

US 2012/0245841 A1 Sep. 27, 2012

(30) Foreign Application Priority Data

Mar. 22, 2011 (EP) .................................... 11002359

(51) Int. Cl.
*G06G 5/00* (2006.01)
*G06T 17/00* (2006.01)
*G01C 21/36* (2006.01)
*G01C 21/34* (2006.01)
*G01C 21/32* (2006.01)
*G01C 21/20* (2006.01)

(52) U.S. Cl.
CPC ............ *G01C 21/3673* (2013.01); *G01C 21/20* (2013.01); *G01C 21/34* (2013.01); *G01C 21/32* (2013.01)
USPC .............................. 701/428; 701/420; 701/532

(58) Field of Classification Search
CPC ......... G01C 21/32; G01C 21/34; G01C 21/20
USPC ........................... 701/71, 420, 428, 532, 619
See application file for complete search history.

(56) References Cited

U.S. PATENT DOCUMENTS

| | | | |
|---|---|---|---|
| 5,684,940 A * | 11/1997 | Freeman et al. | 345/630 |
| 6,360,168 B1 | 3/2002 | Shimabara | 701/211 |
| 6,565,610 B1 | 5/2003 | Wang et al. | 715/517 |
| 6,710,774 B1 | 3/2004 | Kawasaki | |
| 6,718,304 B1 * | 4/2004 | Tachimori et al. | 704/236 |
| 7,084,882 B1 | 8/2006 | Dorum et al. | |

(Continued)

FOREIGN PATENT DOCUMENTS

| | | | | |
|---|---|---|---|---|
| DE | 10 2006 059 922 A1 | 6/2008 | ............ | G01C 21/36 |
| DE | 102008036748 A1 | 10/2009 | ............ | G01C 21/34 |

(Continued)

OTHER PUBLICATIONS

European Search Report issued in European Patent Application No. 11002359.5, dated Sep. 16, 2011.

(Continued)

*Primary Examiner* — Mary Cheung
*Assistant Examiner* — Frederick Brushaber
(74) *Attorney, Agent, or Firm* — Patterson & Sheridan, LLP

(57) ABSTRACT

A navigation system may display a map element represented by a spline including a plurality of vertices. Label coordinate values derived from coordinate values of the plurality of vertices may be retrieved from a database. A label assigned to the map element may be displayed based on the stored label coordinate values. The assigned label may be adapted to the geometric form of at least a portion of the map element.

21 Claims, 4 Drawing Sheets

(56) References Cited

U.S. PATENT DOCUMENTS

| | | | |
|---|---|---|---|
| 7,557,736 B1 | 7/2009 | Daily et al. | |
| 7,665,040 B2 | 2/2010 | Nakamura | |
| 7,765,055 B2 | 7/2010 | Cera et al. | |
| 7,933,395 B1 | 4/2011 | Bailly et al. | |
| 8,260,545 B1* | 9/2012 | Aspen et al. | 701/409 |
| 8,515,664 B2 | 8/2013 | Spindler et al. | |
| 2004/0083108 A1* | 4/2004 | Tachimori et al. | 704/270 |
| 2005/0052413 A1 | 3/2005 | Ueno | 345/158 |
| 2005/0182605 A1* | 8/2005 | Agrawala et al. | 703/2 |
| 2006/0152503 A1 | 7/2006 | Lee et al. | 345/419 |
| 2007/0021911 A1* | 1/2007 | Kikuchi et al. | 701/211 |
| 2007/0192020 A1 | 8/2007 | Brulle-Drews et al. | 701/200 |
| 2007/0229513 A1* | 10/2007 | Bowman | 345/467 |
| 2008/0021644 A1 | 1/2008 | Meyer | 701/211 |
| 2008/0036787 A1* | 2/2008 | Gelber | 345/619 |
| 2008/0198162 A1 | 8/2008 | Ni | 345/442 |
| 2008/0208450 A1 | 8/2008 | Katzer | 701/201 |
| 2008/0298162 A1 | 12/2008 | Passoni | 366/111 |
| 2010/0085350 A1* | 4/2010 | Mishra et al. | 345/419 |
| 2010/0280747 A1* | 11/2010 | Achthoven | 701/200 |
| 2012/0245841 A1 | 9/2012 | Spindler et al. | |

FOREIGN PATENT DOCUMENTS

| | | | | |
|---|---|---|---|---|
| EP | 0652418 A1 | 5/1995 | | G01C 21/20 |
| EP | 0829823 A2 | 3/1998 | | G06T 17/50 |
| EP | 0940795 A2 | 9/1999 | | G08G 1/969 |
| EP | 1 024 467 A2 | 8/2000 | | G08G 1/0969 |
| EP | 1 189 176 A2 | 3/2002 | | G06T 17/50 |
| EP | 1241445 A2 | 9/2002 | | G01C 21/34 |
| EP | 1710713 A1 | 10/2006 | | G01C 17/21 |
| EP | 1 746 391 A1 | 1/2007 | | G01C 21/36 |
| EP | 2273337 A2 | 1/2011 | | G05D 1/02 |
| JP | 08194432 A | 7/1996 | | G09B 29/00 |
| JP | 10-089990 | 4/1998 | | |
| JP | 2000029450 A | 1/2000 | | G09G 5/24 |
| JP | 2007085863 A | 4/2007 | | G01C 21/00 |

OTHER PUBLICATIONS

Office Action, dated Nov. 14, 2012, pp. 1-25, U.S. Appl. No. 13/426,360, U.S. Patent and Trademark Office, Virginia.

European Search Report dated Jun. 25, 2013, pp. 1-3, European Patent Application No. 11 002 357.9, European Patent Office, Rijswijk, Netherlands.

European Search Report dated Jun. 25, 2013, pp. 1-7, European Patent Application No. 11 002 356.1, European Patent Office, Rijswijk, Netherlands.

Office Action, dated Aug. 26, 2013, pp. 1-17, U.S. Appl. No. 13/426,228, U.S. Patent and Trademark Office, Virginia.

European Office Action, EP 11 002 359.5, dated May 22, 2013, 3 pgs.

Office Action, dated Jul. 19, 2013, pp. 1-8, U.S. Appl. No. 13/426,376, U.S. Patent and Trademark Office, Virginia.

* cited by examiner

DIGITAL MAP LABELING SYSTEM

PRIORITY CLAIM

This application claims the benefit of priority from European Patent Application No. 11 002 359.5, filed Mar. 22, 2011, which is incorporated by reference.

BACKGROUND OF THE INVENTION

1. Technical Field

The present invention relates to digital maps representing towns and landscapes that can be used for route guidance by a navigation system and, in particular, it relates to the labeling of map elements.

2. Related Art

The use of navigation systems, in particular, in vehicles such as automobiles has become increasingly prevalent. Usually, on board navigation computer systems analyze the combined data provided by a Global Positioning System (GPS), motion sensors such as antilock breaking system (ABS) wheel sensors, as well as a digital map to determine the actual position and velocity of a vehicle with increasing precision.

A navigation system typically may make use of electronic digital maps to represent cartographic features such as, for example, streets, buildings and rivers. The navigation system may make use of a medium such as, for example, a compact disk or a digital video disc to store the data that relates to the cartographic features. After map matching, an actual position of the user may be indicated in the digital map. By acoustic and/or visualized information, the user may be guided to a predetermined destination.

SUMMARY

A navigation system may display a map element represented by a spline including a plurality of vertices. Label coordinate values derived from coordinate values of the plurality of vertices may be retrieved from a database. A label assigned to the map element may be displayed based on the stored label coordinate values. The assigned label may be adapted to the geometric form of at least a portion of the map element.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
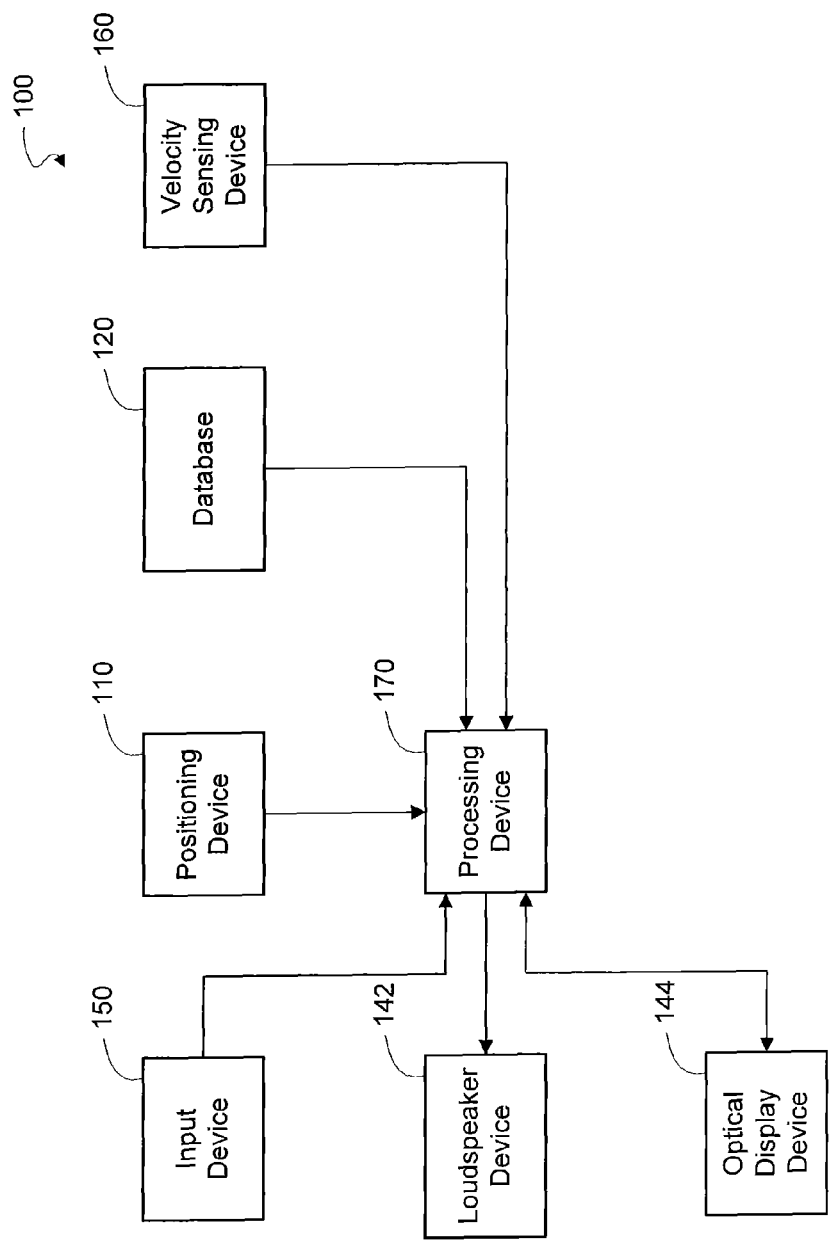
FIG. 1 illustrates one example of a navigation system.

In some examples, navigation systems are able to display detailed digital maps indicating routes to destinations, the types of maneuvers to be taken at various locations such as, for example, junctions as well as different kinds of points of interest such as, for example, gas stations, restaurants, and landmarks. As the vehicle changes position, the vehicle position mark on the displayed image may change or the digital map may be scrolled, while the vehicle position mark remains fixed at a predetermined position.

In some examples, navigation systems may provide enlarged views, for example, of junctions on the guide route where the driver should turn, in order to help the driver to identify the route to be taken to the predetermined destination more accurately. The displayed images may represent simplified synthesized views from the driver's perspective. In some examples, a 2-dimensional representation can confuse the driver, for example, if roads are intersecting a different height levels or in rotary turns with roads in close proximity. Throughout this disclosure, the terms "road" and "street" are used in an interchangeable manner.

In some examples, navigation systems may include algorithms for transforming data from a geographic database into a 3-dimensional perspective view, which may be more easily understood by drivers. Elaborate systems may allow for displaying an intersection approached by the vehicle at variable angles relative to the road depending on the complexity of the intersection. Herein, the terms "intersection" and "junction" are used in an interchangeable way.

In order to provide the navigation functions, the navigation systems may include one or more detailed databases that include data which represent physical features of a geographic region. The employed navigation database may include a main image file including bitmap images including, for example, bitmap of the road geometry, signposts, landmarks, the skyline, etc. The database may include a main image file including bitmap images and/or vector graphics including, for example, bitmap of the road geometry, signposts, landmarks, the skyline, etc.

In the digital maps, particular map elements, such as rivers, mountains, roads, or particular areas, may be displayed supplemented by names (i.e., labels) of the respective map element. For example, a winding river may be labeled by the name of the river, or a mountain range may be displayed together with the name of the mountain range.

In some examples, in two-dimensional and/or three-dimensional digital map representations, labeling by characters representing the names of map elements may not be realized in satisfying manner with respect to an appropriate positioning that allows for uniquely identifying the respective map elements. For example, in the case of three-dimensional digital maps, part of the names used for labeling map elements may be at least partly hidden by the map element depending on the perspective in which the map is displayed to a user. Unintentional hiding of parts of a map element can also happen in two-dimensional digital maps.

The present disclosure provides a method for labeling a map element of a digital map, including storing coordinate values associated with a map element; assigning a label to the map element; and displaying the map element and displaying the assigned label in the digital map based on the stored coordinate values such that the label is adapted to the geometric form of the map element.

Additionally, or alternatively, the method may include representing the map element by at least one spline including vertices and storing coordinate values (i.e., of coordinates in the digital map) derived from coordinate values (i.e., stored coordinate values associated with the map element) of at least some of the vertices of the at least one spline. The map element may be displayed and the assigned label may be displayed in the digital map based on the stored coordinate values such that the label is adapted to the geometric form of the map element.

FIG. 1 is a block diagram of an exemplary navigation system 100 configured for use in a vehicle, such as an automobile, a boat, an airplane, or any other passenger carrying conveyance. The navigation system 100 may include and/or be interfaced to various devices and/or systems. The navigation system 100 may include a positioning device 110 which may determine the position of the vehicle in which the navigation system 100 may be installed or operated. For example, the positioning device 110 may include a global positioning system (GPS) receiver or a comparable satellite positioning system receiver for receiving positioning signals from navigation satellites. In other examples, the positioning device may be any other form of mobile positioning system, such as a beacon system, an angle of arrival system, a time of arrival system, or any combination thereof. A digital map representation, as well as operating instructions and any other data or instructions related to the navigation system 100 may be stored in a database 120 and/or any other memory or memory device. The database 120 may include, for example, a map database configured to store digital map data, a geographic database configured to store geographic data, a navigation database configured to store navigation data, a vector graphics database configured to store vector graphics data (e.g., vector graphics for a landmark or other element), a label database configured to store label data, an animation database configured to store animated data, and/or a junction view database configured to store junction view data. The database 120 may include, for example, one or more of a hard disk device, a CD-ROM device, a DVD device, a ROM memory device, or any other one or more non-transitory data storage devices. In addition, rewritable non-volatile memory, such as flash memory, may be provided to store data and information in a flexible way and/or to maintain the stored information even in the case of a power outage.

The navigation system 100 may include a processing device 170 for performing operation aspects of the navigation system 100, such as providing navigation information (i.e., visual and/or audio output) to the vehicle user (e.g., the driver). The processing device 170 may be configured to include a general processor, a digital signal processor, application specific integrated circuit, field programmable gate array, analog circuit, digital circuit, server processor, combinations thereof, or other now known or later developed processor. The processing device 170 may be configured as a single device or combination of devices, such as associated with a network or distributed processing. Any of various processing strategies may be used, such as multi-processing, multi-tasking, parallel processing, remote processing, centralized processing or the like. The processing device 170 may be responsive to or operable to execute instructions stored as part of software, hardware, integrated circuits, firmware, micro-code, or the like.

The processing device 170 may receive position data from the positioning device 110 and geographic data from the database 120 to determine a current position of the navigation system 100 with respect to the digital map representation. The processing device 170 may generate navigation information on the basis of the current position and/or other received data such as, for example, a destination entered by an occupant of the vehicle. The navigation information may include map data of the area surrounding the current location of the vehicle. Additionally, or alternatively, the navigation information may include navigation instructions (or guidance information) such as, for example, indications of which action should be taken to navigate the vehicle on a preselected navigation route (e.g., "turn left", "turn right", or "follow the course of the road").

The navigation system 100 may include various output devices to present or annunciate the navigation information to the driver. The output devices may include a loudspeaker device 142 and/or an optical display device 144. The loudspeaker device 142 may be a dedicated component of the navigation system 100. Alternatively, the loudspeaker device 142 may be a component of a vehicle entertainment system, such as a car radio, CD player, MP3 player, tape player, or a combination of such devices. If the navigation system 100 shares use of the loudspeaker device 142 with a vehicle entertainment system, the navigation system 100 may include an interface to permit transmission of the output signals corresponding to navigation information to the vehicle entertainment signal. This may be accomplished via a communication link such as a digital data bus in the vehicle. The optical display device 144 may be a full graphic display, such as, for example, a liquid-crystal display, a thin-film transistor display, or a cathode-ray tube display. The optical display device 144 also may be a projection display, such as a head-up display in which optical information may be projected onto a windscreen, or other surface of the vehicle. The optical display device 144 also may be combined with one or more input devices. For example, the optical display device 144 may be configured as a touchscreen device. The optical display device 144 may be a dedicated component of the navigation system 100 or may be used together with other vehicle systems, such as, for example, a multi-media system.

The processing device 170 may receive data from various other devices. The processing device 170 may be coupled to the positioning device 110 to receive a position data signal; to the database 120 to receive one or more of digital map data, geographic data, navigation data, vector graphics data, label data, position data, animated data, and junction view data; to the loudspeaker device 142 to provide an acoustical output data signal; and/or to the optical display device 144 to provide an optical output data signal. The processing device 170 may evaluate position data received from the positioning device 110 via the position data signal and geographic data received from the database 120 to generate navigation information to be output to the vehicle user. The output navigation information may be a corresponding acoustical output signal and/or optical output signal.

Figure 2:
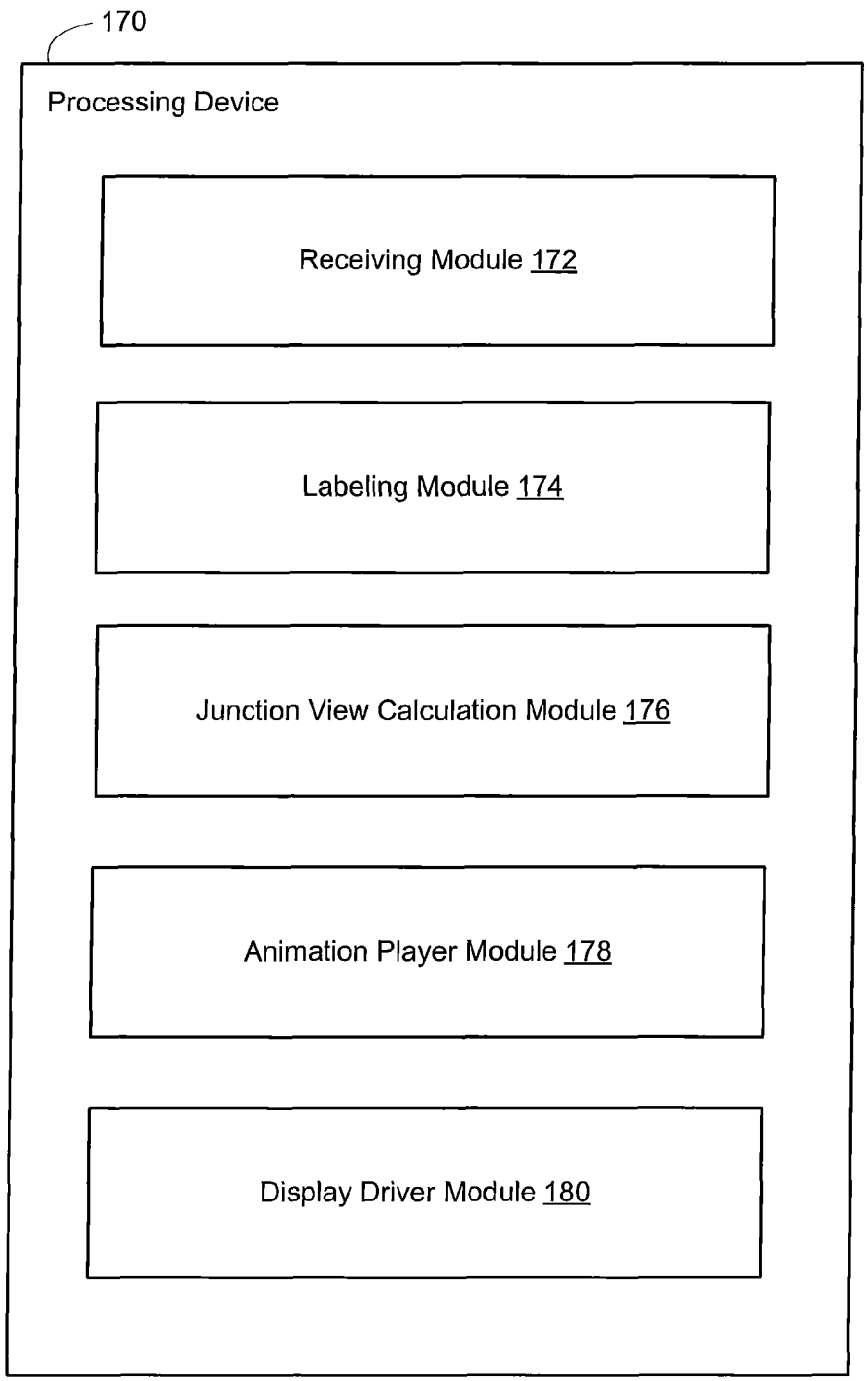
FIG. 2 illustrates one example of a processing device.

In one example, as shown in FIG. 2, the processing device 170 may execute a receiving module 172 configured to receive position data from the positioning device 110, geographic data from the database 120, and/or velocity data from the velocity sensing device 160. The processing device 170 may include a labeling module 174 configured to determine a label based on the received data and to determine a position on the digital map to place the label. The processing device 170 may include a junction view calculation module 176 configured to determine a junction view for display to the user. The processing device 170 may include an animation player module 178 configured to play an animation based on animated data (e.g., audio video interleave format (AVI) data). The processing device 170 may include a display driver module 180 configured to present an appropriate output based on the analysis as further described later. The term "module" may be defined to include one or more executable modules. As described herein, the modules are defined to include software, hardware or some combination thereof executable by a processing device (e.g., the processing device 170). Software modules may include instructions stored in the database 120, or any other memory device, that are executable by the processing device 170 or any other processor. Hardware modules may include various devices, components, circuits, gates, circuit boards, and the like that are executable, directed, and/or controlled for performance by the processing device 170, or any other processor.

Additionally, or alternatively, the navigation system 100 may include an input device 150 as shown in FIG. 1. The processing device 170 may be coupled to the input device 150 to provide the vehicle user with control over functions of the processing device 170. The input device 150 may include suitably designed switches, buttons, a microphone for voice commands, a keyboard, and/or any other mechanism or technique for inputting information to the navigation system 100.

The navigation system 100 may include and/or be interfaced to a velocity sensing device 160 to detect a current velocity of the vehicle. The velocity sensing device 160 may include motion sensors, such as Anti-Lock Braking System (ABS) wheel sensors. These sensors may be positioned in proximity to each individual wheel or within a differential of the vehicle. The processing device 170 may be coupled to the velocity sensing device 160 to receive a velocity data signal. Alternatively, or additionally, the processing device 170 may be configured to calculate the velocity of the vehicle using the position data received from the positioning device 110. The processing device 170 may calculate the velocity by analyzing the change in the position of the vehicle over a period of time.

A map element is a graphical element of the map that may represent a physical object such as, for example, a building, a road, a mountain, a river, a lake, etc. The map element can be given by a bitmap or a vector graphic object.

A label assigned to the map element is a name that may identify the map element such as, for example, the name of a building, a road, a mountain, a river, a lake, etc. The label may be stored, for example, as label data in a database. In one example, the label data may be stored in a geographic database with or as a part of corresponding map element data. In other words, the map element data may include the label data for the map element. In other examples, the label data may be stored in a database separate from the corresponding map element data. The label data may include a size of the label. The size of the label may be used to ensure that there is no overlap between the label and at least a portion of the map element when the map element and the label are displayed together as further described later. The assigned label in the digital map may be displayed at an appropriate place in an appropriate manner after reading the stored coordinate values as further described later.

The label can be represented (i.e. drawn) by means of one or more splines. Additionally, or alternatively, the map element may be represented (i.e. drawn) by means of one or more splines. The term "spline" denotes a function that is defined piecewise by polynomials as further described below.

In one example, the map element such as, for example, a river, a mountain range, a road, etc., may be represented in the digital map by means of a spline. The vertices used for the representation of the map element can be used for the labeling of the map element. For example, the map element may be defined by a list of points (i.e., coordinates) or vectors that can be used for defining the label such that the label can be displayed in a manner such that the shape (i.e., geometrical form) of the label is adapted to the shape (i.e., geometrical form) of the displayed map element.

In one example, m−1 vertices (i.e., knots) $t_i$, i=0, . . . m, may be used for the representation of the map element. The vertices may be associated with coordinates $(x_i, y_i)$ in the digital map (or $(x_i, y_i, z_i)$ in the case of a three-dimensional digital map). In one example, coordinates for positioning the label may be derived from the coordinates of vertices used for the splines. For example, coordinates corresponding to (i.e., derived from) the vertices used for the spline representation of the map element can be used for the representation of the label (i.e., name) of the map element. For example, a number of the vertices can be chosen and coordinates $(x_i+d_x, y_i+d_y)$, shifted to some degree (e.g., offset by a determined distance) with respect to the coordinates of the vertices with constants $d_x$ and $d_y$, can be stored for the generation of the label, for example, the generation of one or more splines by which the label can be generated. A label, which may include characters, symbols, and/or icons following substantially the geometric shape (e.g., a curve) or the outer contour of the map element can be displayed in the digital map.

Consequently, the readability of the labels of the map elements of a digital map can be improved. Additionally, or alternatively, since the coordinate values of the labels may be pre-stored, display of curved labels may not result in a significant increase of the processor load when displaying the digital map. For example, the correct positioning of the characters of the labels may not be calculated online (i.e., in real time) but, rather, can be achieved by reading the corresponding coordinate values from the database storing the coordinate values.

In any of the examples described throughout this disclosure, the digital map may be a two-dimensional map or a three-dimensional map. For example, the three-dimensional digital map may be generated based on a digital terrain model. A terrain model is a three-dimensional model (e.g., a digital model of a landscape obtained by laser-scanning). A variety of topographic terrain models may be available from official institutions and/or commercial providers. A digital terrain model may be a digital file including terrain elevations for ground positions at regularly or irregularly spaced horizontal intervals. The term "terrain" as used herein includes the three-dimensional topography of an urban area, a city, a village, etc. The raster points included in the terrain model may have three-dimensional coordinate values.

In any of the examples described throughout this disclosure, the label may be a two-dimensional label or a three-dimensional label. For example, the three-dimensional label may include three-dimensional representations of characters. In one example, the label may include characters, symbols, and/or icons, and the label may be displayed such that the positioning and the shape of the characters, symbols, and/or icons are adapted to the geometric form of the map element. The label can be given by a vector graphic object and/or a bitmap. The label may include a vector graphic objet and/or a bitmap.

Figure 3:
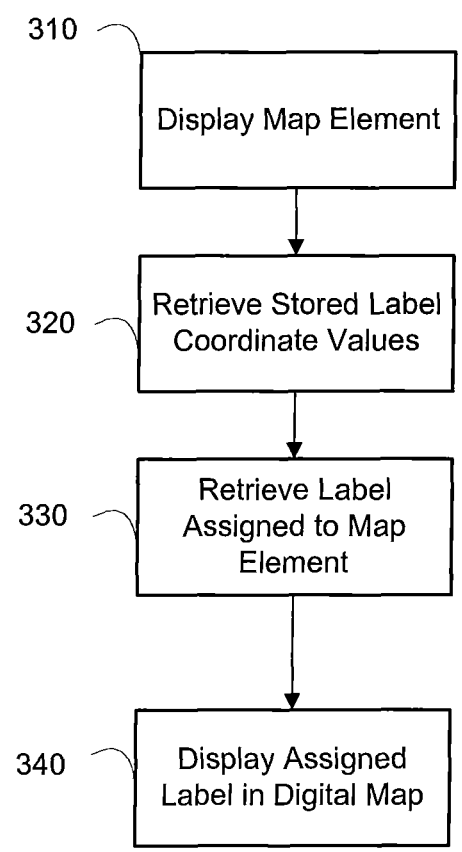
FIG. 3 illustrates one example of a method for displaying a label on a digital map.

In one example, a method for labeling a map element, as shown in FIG. 3, may include displaying a map element at step 310. The map element may be represented by at least one spline including a plurality of vertices. The method may include retrieving from a database, at step 320, stored label coordinate values derived from coordinate values of at least one of the plurality of vertices of the at least one spline and retrieving from the database, at step 330, a label assigned to the map element. The method may include, at step 340, displaying the assigned label based on the stored label coordinate values such that the label is adapted to the geometric form of at least a portion of the map element.

In one example a method for labeling a map element may include determining a portion of the map element where no labeling shall occur and/or a portion in the vicinity of the map element in the digital map where no labeling shall occur and labeling the map element with the label such that the portion of the map element where no labeling shall occur and/or the portion in the vicinity of the map element in the digital map where no labeling shall occur is not covered by the label. Thereby, it can be avoided that a part of the map element is unintentionally hidden by the label. In other words, the label may be displayed on the digital map such that the portion of the digital map where no labeling shall occur is not occupied by any part of the label. The combination of avoiding hiding of a map element by a label and labeling with labels following the shape (i.e., contour) of a map element may synergetically result in an increased readability of the labels and identification of the corresponding map element by the label.

In one example, a method for route guidance implemented in a navigation system such as, for example, a vehicle navigation system, with a display device may include the steps of the method according to one of the above-described examples and providing guidance information to a user of the navigation system.

In one example, a computer program product may include one or more computer readable media having computer-executable instructions for performing the steps of the method according to one of the above-described examples. The computer program product may include any type of computer readable media, such as, for example, random access memory, flash memory, a hard drive, a CD-ROM device, a DVD device, a ROM memory device, or any other non-transitory data storage device. In addition, rewritable non-volatile memory, such as flash memory, may be provided to store processing information in a flexible way and to maintain the stored information even in the case of a power outage.

In one example, a navigation database may include a tangible computer readable medium including digital map data including map element data including, for example, data for coordinates of a map element; label data including, for example, data of a label for the map element; and references between the label data of the label for the map element and the map element data of the map element.

In one example, a navigation database may include a tangible computer readable medium including digital map data including, for example, data of vertices of at least one spline by which a map element may be represented; data including, for example, coordinate values related to the vertices; data including, for example, data of a label for the map element; and references between the data of the label for the map element and the coordinate values.

The references may be links (e.g., data links) by which the label may be associated with the data of the map element or the coordinate values, respectively, such that the label may be accessed by a processing unit for display of the label, and the location in the digital map where the label is to be displayed can be determined by the associated data of the map element or the coordinate values, respectively.

In one example, a navigation system such as, for example, a vehicle navigation system may include a navigation database (e.g., a navigation database as described above); and a display means configured to display a digital map based on data of the navigation database such that the map element of the digital map may be labeled by the label with characters, symbols, and/or icons substantially following the geometric shape of the map element.

In any of the examples described throughout this disclosure, the digital map can be a two-dimensional map or a three-dimensional map. Additionally, or alternatively, the label can be a two-dimensional label or a three-dimensional label. For example, the three-dimensional label may include three-dimensional representations of characters, symbols, and/or icons. The map element can be given by a bitmap and/or a vector graphic object. Additionally, or alternatively, the label can be given by a bitmap and/or a vector graphic object.

In one example, a method for route guidance may be implemented in a navigation system such as, for example, a vehicle navigation system, with a display device and may include the steps of determining with the positioning device 110 a location of the vehicle; displaying on the optical display device 144 a digital map for a surrounding area of the determined location of the vehicle; and providing guidance information to a user of the navigation system; where displaying the digital map includes displaying a map element and displaying an assigned label in the digital map such that the label is adapted to the geometric form of the map element. The map element may be represented by at least one spline including vertices. Additionally, or alternatively, the method may include storing coordinate values derived from coordinate values of at least some of the vertices of the at least one spline, where the assigned label is displayed in the digital map based on the stored coordinate values.

Figure 4:
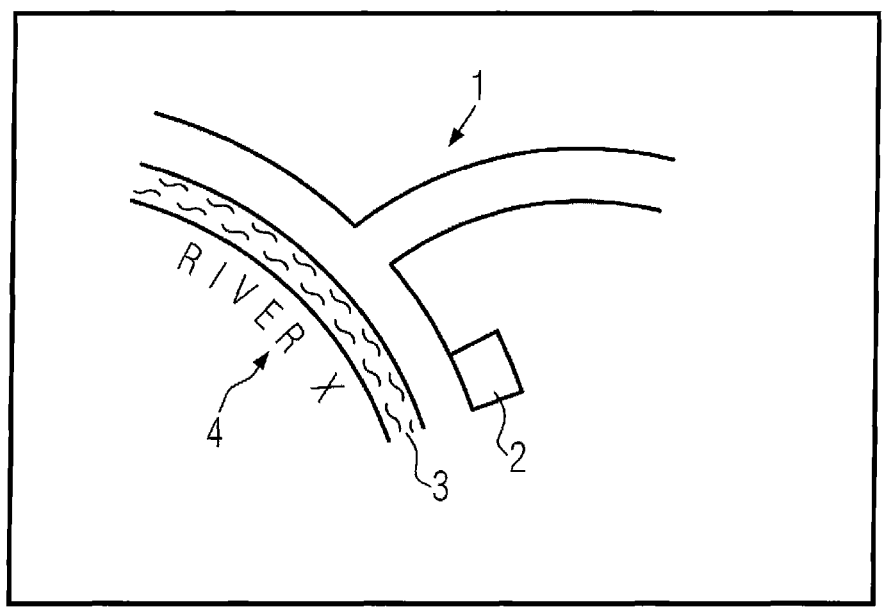
FIG. 4 illustrates a section of one example of a digital map including a label.

FIG. 4 illustrates a part of one example of a digital map showing some streets 1, a parking lot 2, and a river 3. The river 3 represents a map element that is labeled by the label "River X" 4 giving the name of the river. As it is shown in FIG. 4 the label may be adapted to the geometrical shape of the map element representing the river 3. In other words, the label may include (i.e., the characters, symbols, and/or icons of the label may be arranged in) a geometric shape that substantially corresponds to a geometric shape of the map element. For example, the characters of the label may be positioned relative to one another such that the label includes a curve that substantially corresponds to a curve of a portion of the map element as shown in FIG. 4. In one example, the label may be generated by means of splines. Additionally, or alternatively, the map element representing the river 3 may be generated by means of splines. A spline function of a given degree, smoothness and domain partition, can be represented as a linear combination of B-splines (i.e., basis splines) of that same degree and smoothness. For example, a Catmull-Rom (i.e., cubic) spline can be employed. In another example, B-splines can be evaluated by the well-known (Cox) de Boor algorithm. For a given non-decreasing sequence of m−1 vertices (i.e., knots) $t_i$, i=0, . . . m, a B-spline of degree n is a parametric curve composed of $$C(t) = \sum_{i=1}^{m} P_i b_{i,n}(t)$$

where $P_i$ are control points and $b_{i,n}$ are basis functions defined by the recursion $$b_{i,0}(t) = \begin{cases} 1, & \text{if } t_i \le t \le t_{i+1} \\ 0, & \text{else} \end{cases}$$

-continued
$$b_{i,n}(t) = \frac{t - t_i}{t_{i+n} - t_i} b_{i,n-1}(t) + \frac{t_{i,n+1} - t}{t_{i+n+1} - t_{i+1}} b_{i+1,n-1}(t)$$

The curve may be completely contained in the convex hull of its control points provided that the basis functions all have the same sign (which usually is chosen positive). When the knots are equidistant, the B-splines are called uniform B-splines. The basis functions $b_{i,n}$ may determine how strongly the control points $P_i$ influence the curve. In one example, the stored raster points that form a subset of the raster points of the provided digital terrain model may be directly used as the control points $P_i$. In another example, a distance of the raster points to corresponding points of the three-dimensional B-spline surfaces (i.e., patches) may be minimized as further described later.

When the number of knots equals the degree of the B-spline, the latter represents a Bezier curve. Examples of B-splines that can be used in any of the exemplary methods described throughout this disclosure may include the constant B-spline, which may be considered the most simple spline, with $b_{i,n}$ chosen as $b_{i,0}$, and the linear B-spline with $$b_{i,1}(t) = \begin{cases} \frac{t - t_i}{t_{i+1} - t_i}, & \text{if } t_i \leq t \leq t_{i+1} \\ \frac{t_{i+2} - t}{t_{i+2} - t_{i+1}}, & \text{if } t_{i+1} \leq t \leq t_{i+2} \\ 0, & \text{else}. \end{cases}$$

Whereas the constant and linear B-splines may be considered rather simple, a more satisfying interpolation can be obtained by, for example, uniform quadratic or uniform cubic B-splines. Uniform quadratic splines may be calculated in matrix form for the i+1-th segment of the curve C by $$C_i(t) = \begin{bmatrix} t^2 & t & 1 \end{bmatrix} \frac{1}{2} \begin{bmatrix} 1 & -2 & 1 \\ -2 & 2 & 0 \\ 1 & 1 & 0 \end{bmatrix} \begin{bmatrix} p_i \\ p_{i+1} \\ p_{i+2} \end{bmatrix},$$

and uniform cubic splines may be calculated in matrix form for the i+1-th segment of the curve C by $$C_i(t) = \begin{bmatrix} t^3 & t^2 & t & 1 \end{bmatrix} \frac{1}{6} \begin{bmatrix} -1 & 3 & -3 & 1 \\ 3 & -6 & 3 & 0 \\ -3 & 0 & 3 & 0 \\ 1 & 4 & 1 & 0 \end{bmatrix} \begin{bmatrix} p_i \\ p_{i+1} \\ p_{i+2} \\ p_{i+3} \end{bmatrix}.$$

The splines may be generated by means of vertices (i.e., knots), and coordinate values may be stored corresponding to the coordinate values of the coordinates of the vertices. In one example, not the coordinate values of the vertices themselves are stored for the generation of the label but rather different coordinate values that are determined based on the coordinate values of the vertices may be stored. If, for example, three vertices with coordinates $(x_1, y_1)$, $(x_2, y_2)$ and $(x_3, y_3)$ are used for drawing the map element that is to be labeled (e.g., the river 3 as shown in FIG. 4), coordinates $(x_1+d_x, y_1+d_y)$, $(x_2+d_x, y_2+d_y)$ and $(x_3+d_x, y_3+d_y)$ may be used for positioning the label 4, where $d_x$ and $d_y$ are constants by which the coordinate values of the vertices are shifted. In other words, the coordinates $(x_1+d_x, y_1+d_y)$, $(x_2+d_x, y_2+d_y)$ and $(x_3+d_x, y_3+d_y)$ may be stored and subsequently retrieved for the labelling process. Thus, the label 3 can be adapted to the geometrical shape of the river 4. In another example, the coordinates $(x_1, y_1)$, $(x_2, y_2)$ and $(x_3) y_3)$ themselves may be stored and subsequently retrieved for the labelling process.

The example shown in FIG. 4 includes a section of a two-dimensional digital map and a two-dimensional label "River X". Other examples may include a three-dimensional digital map including two-dimensional and/or three-dimensional labels. In other examples, not only the positions of the letters of a label are adapted to the shape of the map element labeled, but also the shape of the letters (e.g., three-dimensional letters) of the label can be adapted to the shape of the map element labeled.

In one example, the label may be adapted to a river representing a map element, as shown in FIG. 4. In other examples, a label can be adapted in geometric form to any two-dimensional or three-dimensional map element such as, for example, a street, road, building, piece of a junction, etc., that may be displayed in graphical form in a digital map.

In one example, the label may consist of or include some graphics such as, for example, graphics in the tagged image file format (TIFF) or the portable network graphics (PNG) format. The PNG format was designed to replace the older and simpler graphics interchange format (GIF) and, to some extent, the much more complex TIFF. In other examples, the label may consist of or include graphics in GIF or any other type of graphics format. For image editing, PNG may provide a useful format for the storage of intermediate stages of editing. Compression in the PNG format may be fully lossless. The PNG format may support up to 48-bit true color or 16-bit grayscale. Saving, restoring and re-saving an image in the PNG format may not degrade the quality of the image to the same extent as an image in another format such as, for example, the joint photographic experts group (JPEG) format. The GIF, TIFF, and PNG formats may be described as raster formats that represent an image as a two-dimensional array of colored dots or pixels.

The PNG format may support three main image types: true color, grayscale, and palette-based. The PNG format may support three main types of integrity-checking to help avoid problems with file transfers and the like. The first and simplest type of integrity-checking may be the eight-byte magic signature at the beginning of a PNG image. The second type of integrity-checking may be known as a 32-bit cyclic redundancy check. The third type of integrity check may apply only to the image-data chunks and may be similar to the cyclic redundancy check.

In any of the examples described throughout this disclosure, the digital map may be configured as any kind of digital map. For example, the digital map may be used in a navigation system for pedestrians or a vehicle navigation system such as, for example, a navigation system installed in an aircraft, boat, automobile, or any other passenger carrying conveyance.

In any of the examples described throughout this disclosure, the navigation system may be configured to display detailed three-dimensional junction views. For example, video data may be obtained from a junction and stored to a database (e.g., an offline-database). The database may include a main image file including, for example, bitmap images for all lanes, sign post information, landmarks, etc. In one example, the navigation system may model the junction view on the basis of the afore-mentioned database by means of, for example, standard bitmap images. These bitmap images may consist of or include a bitmap of the road geometry. For example, the bitmap of the road geometry may include a bitmap of three lanes with an exit for one of these lanes, a bitmap of the recommended lane, bitmaps for signposts, landmarks, the skyline, and the color of the sky. Elements of the three-dimensional junction views can be stored in one single data array representing an image containing the plurality of icons.

In any of the examples described throughout this disclosure, the navigation system may be configured to display detailed three-dimensional animated junction views. In one example, when a vehicle in which the navigation system is installed approaches a junction, a representation of the respective junction may be provided by a junction view database. In one example, the junction view database may include references to an animation database storing animated data. The animated data may include data units that may include bitmaps, vector graphics, and/or metafiles (i.e., combined bitmaps and vector graphics).

The animation data may include a temporal sequence of individual static images. The speed at which the animation takes place may depend on the location and/or speed of the vehicle. The animation data may show perspective views of the approached junction (i.e., number of lanes, slopes, branches and crossroads, etc). Additionally, or alternatively, the animation data may include topographical objects such as, for example, bridges and administrative buildings, and/or signposts, and/or environmental views representing, for example, an urban, rural, or industrial environment, or a mountain landscape.

A junction view calculation module of the navigation system may address the animation database to obtain the relevant animated junction view data. Alternatively, the junction view calculation module may produce animated data from standard images provided by an animation database, a junction view database, and/or a map database.

In one example, the animated data can be available in the Audio Video Interleave (AVI) format. The AVI data may be provided to an AVI player of the navigation system. The animation may start and/or end at well-defined positions ahead and behind the junction. It may be desirable for the AVI player to be synchronized with data provided by a location system determining accurately the actual position of the vehicle. Thereby, the elapsed time may be synchronized with the driven distance, and the synthesized animated junction view may be displayed on the display device of the navigation system synchronously to the actual position of the vehicle. The labels referred to throughout the present disclosure may label any of such elements of an animated junction view.

The labels referred to throughout the present disclosure may be provided in the form of, for example, signposts. Signposts may represent signs that, in the physical environment may be positioned, for example, at highway intersections (e.g., intersections of German Bundesstraβen and Autobahnen) and/or may indicate the direction to a city, a facility such as an industrial area, a soccer stadium, an airport, etc., the number of a road, a highway, etc., and/or the road number of a road branching at an intersection (i.e., junction).

The signpost may include a text, a symbol, and/or an icon. Additionally, or alternatively, the signpost may include some background. The background can be a graphical object showing a transparent, semi-transparent, or non-transparent colored or non-colored plane or three-dimensional body. In one example, the (data of) the text and/or the symbol/icon of a signpost may be stored in a navigation database and independently from the (data of) text, the symbol, and/or the icon. Additionally, or alternatively, the (data of) a background of the signpost also may be stored in the navigation database.

Thereby, the memory demand for a particular signpost at a particular memory location can be reduced.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A method for labeling a map element of a digital map, the method comprising:
    displaying the map element on a display device, where the map element is represented by at least one spline comprising a plurality of vertices;
    retrieving from a database a label assigned to the map element, where the label comprises a plurality of components including one or more of characters, symbols, and icons;
    retrieving from the database stored label coordinate values, where the stored label coordinate values describe positions of the plurality of components in the assigned label, and each of the stored label coordinate values is derived from coordinate values of at least one of the plurality of vertices of the at least one spline and stored in the database prior to displaying the map element; and
    determining a portion of the digital map where no labeling shall occur, the portion of the digital map where no labeling shall occur comprising at least a segment of the map element;
    displaying on the display device the assigned label in the digital map based on the retrieved stored label coordinate values such that the positions and shapes of the plurality of components in the assigned label are adapted to a geometric form of at least a portion of the map element represented by the at least one spline, and that the determined portion of the digital map where no labeling shall occur is not occupied by any part of the assigned label.

2. The method of claim 1, where the digital map is a three-dimensional map generated based on a digital terrain model.

3. The method of claim 1, where the assigned label is a three-dimensional label comprising a three-dimensional representation of at least one of a character, a symbol, and an icon.

4. The method of claim 1, where the map element is given by a bitmap or a vector graphic object.

5. The method of claim 1, where the assigned label comprises a vector graphic object or a bitmap.

6. The method of claim 1, where the assigned label is displayed such that a region of the map element positioned outside of the determined portion of the digital map where no labeling shall occur is at least partially covered by at least a part of the assigned label.

7. The method of claim 1, where the stored label coordinate values are offset by a determined distance from the corresponding coordinate values of at least one of the plurality of vertices of the at least one spline.

8. The method of claim 1, where displaying the map element comprises displaying the map element on the display device of a vehicle navigation system, displaying the assigned label in the digital map comprises displaying the assigned label in the digital map on the display device of the vehicle navigation system, and the method further comprises providing guidance information to a user of the navigation system.

9. The method of claim 1, where retrieval of the stored label coordinate values is independent of a retrieval of the assigned label.

10. The method of claim 1, where displaying the assigned label based on the stored coordinate values is performed without online calculation of a position of the assigned label during the displaying step.

11. The method of claim 1, where the stored label coordinate values are derived using splines.

12. A tangible non-transitory computer readable storage medium comprising a plurality of instructions executable by a processor, the tangible non-transitory computer readable medium comprising:
   instructions executable to display a map element, where the map element is represented by at least one spline comprising a plurality of vertices;
   instructions executable to retrieve stored label coordinate values;
   instructions executable to retrieve a label assigned to the map element, where the assigned label comprises a plurality of components including at least one of a character, a symbol, and an icon, where the stored label coordinate values describe the position of each of the plurality of components of the assigned label, and the position of each of the components of the assigned label is predetermined based on coordinate values of at least one of the plurality of vertices of the at least one spline prior to retrieving the map element; and
   instructions executable to display the assigned label in a digital map based on the stored label coordinate values such that the positions and shapes of the plurality of components in the assigned label are adapted to a geometric form of at least a portion of the map element represented by the at least one spline, and that the assigned label is displayed such that the assigned label is excluded from a portion of the digital map, where the portion of the digital map comprises at least a segment of the map element.

13. The tangible non-transitory computer readable storage medium of claim 12, where the assigned label is a three-dimensional label comprising a three-dimensional representation of at least one of a character, a symbol, and an icon.

14. The tangible non-transitory computer readable storage medium of claim 12, where the stored label coordinate values are offset by a determined distance from the corresponding coordinate values of at least one of the plurality of vertices of the at least one spline.

15. A navigation system for use in a vehicle, the navigation system comprising:
   a navigation database comprising data stored on a tangible non-transitory computer readable storage medium, the data comprising digital map data comprising data of vertices of at least one spline by which a map element is represented, label data comprising data of a label assigned to the map element, label position data comprising pre-calculated coordinate values related to the vertices, and reference data comprising data of a reference between the label assigned to the map element and the pre-calculated coordinate values related to the vertices; and
   a display configured to display the map element and the assigned label on a digital map based on data of the navigation database, where the assigned label is positioned based on the pre-calculated coordinate values such that each of a plurality of components of the assigned label comprises a respective geometric shape that substantially corresponds to a geometric shape of the map element and such that the assigned label does not overlap a portion of the digital map where no labeling shall occur, the portion of the digital map comprising at least a segment of the map element,
   where the plurality of components comprises at least one of a character, a symbol, and an icon, and the pre-calculated coordinate values of the label position data describe a position of each of the plurality of components of the assigned label.

16. The navigation system of claim 15, where the digital map is a three-dimensional map.

17. The navigation system of claim 15, where the assigned label is a three-dimensional label comprising a three-dimensional representation of the plurality of components of the label.

18. The navigation system of claim 15, where the map element is given by a bitmap or a vector graphic object, and the assigned label is given by a vector graphic object.

19. The navigation system of claim 15, where the pre-calculated coordinate values related to the vertices are offset by a determined distance from corresponding coordinate values of the vertices.

20. A method for route guidance for use in a navigation system, the method comprising:
   determining with a positioning device a location of the navigation system;
   displaying on a display a digital map for an area surrounding the determined location of the navigation system; and
   providing with an output device guidance information for receipt by a user of the navigation system;
   where displaying the digital map comprises displaying a map element and displaying an assigned label in the digital map based on stored coordinate values, where the assigned label comprises a plurality of components including at least one of a character, a symbol, and an icon, such that positions and shapes of the plurality of the components in the assigned label are adapted to a geometric form of the map element; and
   where the assigned label is represented by at least one spline comprising a plurality of vertices, and the stored coordinate values describe a position of each vertex of the spline representing the assigned label and are predetermined based on coordinate values of the map element prior to determining the location of the navigation system.

21. The method of claim 20, where the map element is represented by at least one spline comprising vertices, and the method further comprises retrieving from a database the stored coordinate values derived from the coordinate values of at least one of the vertices of the at least one spline.

* * * * *